3,661,935
Patented May 9, 1972

3,661,935
ANTIFUNGAL BENZOPYRAN-5-ONE DERIVATIVE

David Cecil Aldridge, Douglas Broadment, Harold George Hemming, and William Brian Turner, Macclesfield, and Keith Joseph Bent, Bracknell, England, assignors to Imperial Chemical Industries Limited, London, England
No Drawing. Filed Oct. 16, 1969, Ser. No. 867,083
Claims priority, application Great Britain, Oct. 29, 1968, 51,273/68
Int. Cl. C07d 7/18
U.S. Cl. 260—343.2 R          1 Claim

ABSTRACT OF THE DISCLOSURE

The compound 2,3,3a,9b - tetrahydro - 6 - hydroxy-7,8 - dimethoxy - 2 - n - propyl - 5H - furo[3,2 - c]-benzopyran-5-one, obtained by fermentation of *Helminthosporium monoceras* exhibits anti-fungal properties.

This invention relates to a new chemical compound and more particularly it relates to a new heterocyclic compound which possesses antifungal properties.

According to the invention we provide the heterocyclic compound 2,3,3a,9b - tetrahydro - 6 - hydroxy - 7,8-dimethoxy - 2 - n - propyl - 5H - furo[3,2 - c][2] - benzopyran-5-one, which has the formula:

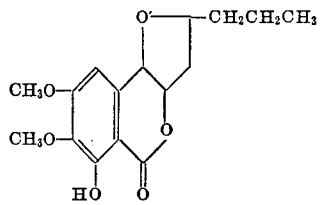

The compound is hereinafter described as I.C.I. Compound No. 209,946 and references in this specification to "the heterocyclic compound" are to be taken as references to this compound.

According to a further feature of the invention we provide a process for the manufacture of I.C.I. Compound No. 209,946 which comprises cultivation of the organism *Helminthosporium monoceras* in a nutrient medium containing an assimilable source of carbon and an assimilable source of nitrogen, followed by isolation of the product from the medium.

The fermentation process may be carried out by means of surface culture or it may be carried out in deep culture in a stirred aerated medium under batchwise or continuous conditions.

As a suitable active strain of the organism there may be mentioned, for example, *Helminthosporium monoceras* which is available to the public from the Commonwealth Mycological Institute located at Kew, England where it is identified as CMI 125855. The fermentation may be carried out at a temperature of about 18–38° C. and preferably at a temperature of about 20–30° C. Growth of the organism is allowed to continue for a period of about 3–15 days under stirred aerated culture conditions or for a period of about 6–20 days, preferably about 13 days, under surface culture conditions before the desired product is isolated from the culture medium.

A suitable assimilable source of carbon is, for example, a polyhydric alcohol, for example sucrose, glucose or glycerol, or a mixture of two or more substances. The carbon source is generally present in the medium within the range of about 0.1–30% by weight and preferably within the range of about 5–15% by weight. A suitable assimilable source of nitrogen may be an inorganic source or an organic source. The nitrogen may conveniently be provided initially in the form of, for example, an alkali metal or alkaline earth metal nitrate, or an ammonium salt of an inorganic acid or an organic acid, for example sodium, potassium, calcium or ammonium nitrate or ammonium tartrate, ammonium sulphate or ammonium phosphate. It may also be provided in the form of an amino-acid, for example glycine, a seed meal, for example cottonseed meal, or corn steep liquor, peptone, urea, a yeast extract or a meat extract. It is to be understood that the assimilable source of nitrogen may be a mixture of two or more of the above mentioned substances. The nitrogen source is generally present in the medium in an amount such that there is present between about 0.01% and about 0.5% of elementary nitrogen in the medium. The medium usually contains smaller quantities of essential elements such as phosphorus (for example as diammonium hydrogen phosphate), magnesium (for example as magnesium carbonate), sulphur (for example as a sulphate) and potassium (for example as potassium carbonate) and minute quantities of so-called trace elements such as iron, manganese, zinc, molybdenum and copper.

The desired compound is present in the culture medium and it may be isolated therefrom by filtration followed by extraction with a suitable organic solvent, for example ethyl acetate, butyl acetate or chloroform. The product may be purified by chromatography, for example by chromatography on a silica gel column using mixtures of benzene and chloroform as eluant, or by preparative thin-layer chromatography.

As stated above, the heterocyclic compound of the invention possesses antifungal properties, and they may be used for the treatment of fungal infections of plants. In particular, I.C.I. Compound No. 209,946 is active against a variety of fungal diseases of plants including, for example, the following specific diseases:

*Sphaerotheca fuliginea.*—(powdery mildew) on cucumber
*Erysiphe graminis.*—(powdery mildew) on wheat and barley
*Sphaerotheca pannosa.*—(mildew) on roses
*Diplocarpon rosae.*—(black spot) on roses
*Podosphaera leucotricha.*—(powdery mildew) on apples
*Uncinula necator.*—(powdery mildew) on vine
*Piricularia oryzae.*—(blast) on rice
*Plasmopara viticola.*—(downy mildew) on vine
*Fusarium culmorum.*—(foot-rot) on wheat
*Phytophthora infestans.*—(late blight) on tomato A particularly useful feature of the activity of the heterocyclic compound of the invention is its systemic effect, that is to say, its ability to move throughout a plant to reach any part thereof and to combat any fungal infection thereon; it is possible with its use, therefore, to produce a composition which has valuable systemic fungicidal activity.

According to a further feature of the invention we provide a fungicidal composition which comprises the heterocyclic compound of the invention in association with a diluent or carrier therefor.

The compound and compositions of the invention are useful for agricultural or horticultural purposes and the compound or type of composition used in any instance will depend upon the particular purpose for which it is to be used.

The compositions of the invention may be in the form of dusting powders or granules wherein the active ingredient is mixed with a solid diluent or carrier. Suitable solid diluents or carriers may be, for example, kaolin, pumice, bentonite, kieselguhr, dolomite, calcium carbonate, talc, powdered magnesia, fuller's earth, gypsum, hewitt's earth, diatomaceous earth and china clay. Compositions suitable for dressing seeds may, for example, also contain an agent which will assist the adhesion of the composition to the seed, for example, a mineral oil, or a vegetable oil such as castor oil. Alternatively, solid compositions may be in the form of dispersible powders or grains which contain in addition to the active ingredient, a wetting agent to facilitate the dispersion of the powder or grains in liquids. Such powders or grains may include fillers, suspending agents and the like.

The compositions may also be in the form of liquid preparations to be used, for example, as sprays which are generally aqueous dispersions or emulsions containing the active ingredient in the presence of one or more wetting agents, dispersing agents, emulsifying agents or suspending agents. Wetting agents, dispersing agents and emulsifying agents may be of the cationic, anionic or non-ionic type. Suitable agents of the cationic type include, for example, quaternary ammonium compounds, for example cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium calcium or ammonium lignosulphonate, butyl-naphthalenesulphonate, and a mixture of the sodium salts of diisopropyl- and triisopropyl-naphthalenesulphonic acids. Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes, trimethylbenzene, methylchloroform and trichloroethylene.

The compositions to be used as sprays may also be in the form of aerosols wherein the formulation is held in a container under pressure in the presence of a propellant such as fluoro-trichloromethane or dichlorodifluoromethane.

By the inclusion of suitable additives, for example additives for improving the distribution, adhesive power and resistance to rain on treated surfaces, the different compositions can be better adapted for the various uses for which they are intended.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and, after such storage, to be capable of dilution with water in order to form aqueous preparations which remain homogeneous for a sufficient time to enable them to be applied by conventional spray equipment. The concentrates may contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used. For agricultural or horticultural purposes, an aqueous preparation containing between 0.0001 and 1.0% and preferably between 0.001% and 0.1%, by weight of active ingredient or ingredients may be used.

The compositions of the invention may be stabilised by the incorporation therein of stabilising agents, for example epoxides, for example epichlorohydrin.

It is to be understood that the fungicidal compositions of this invention may comprise, in addition to the heterocyclic compound of the invention, one or more other compounds having biological activity. In particular, the heterocyclic compound of the invention may be formulated by admixing with fertilizers. A preferred composition of this type comprises granules of fertilizer material incorporating, for example coated with the heterocyclic compound of the invention. The fertilizer material may, for exampl,e comprise nitrogen, or phosphate-containing substances.

According to a further feature of the invention, therefore, we provide a fertilizer comprising the heterocyclic compound as hereinbefore defined, together with at least one agent of fertilizing utility.

In use, the heterocyclic compound of the invention, or compositions containing it may be applied in a number of ways. Thus their application can suitably be directly onto the foliage of the plant or to infected areas thereof; alternatively the soil surrounding the plant, or soil in which the seeds or plants are to be sown or planted can be treated, for example by drenching with the heterocyclic compound of the invention or with compositions containing it. Alternatively, if desired, the seeds themselves can be treated directly, for example the seeds may be dressed with the heterocyclic compound of the invention, or with compositions containing it.

According to a further feature of the invention, therefore, we provide a method of combating undesired fungal infections in plants which comprises applying to a plant, or to seeds thereof, or to the locus of the plant, the heterocyclic compound of the invention, or a composition containing the same as hereinbefre defined.

According to yet a further feature of the invention we provide a method for treating agricultural soil which comprises applying to said soil a heterocyclic compound of the invention or a composition containing the same as hereinbefore defined.

The invention is illustrated but not limited by the following examples:

EXAMPLE 1

This example illustrates a method for the preparation of the heterocyclic compound.

A culture medium is made up as follows:

| | G. |
|---|---|
| D-tartaric acid | 2.66 |
| Ammonium tartrate | 2.66 |
| Diammonium hydrogen phosphate | 0.4 |
| Potassium carbonate | 0.4 |
| Magnesium carbonate | 0.27 |
| Ammmonium sulphate | 0.16 |
| Ferrous sulphate heptahydrate | 0.042 |
| Zinc sulphate | 0.042 |
| Yeast extract ("Oxoid" brand; "Oxoid" is a registered trademark) | 1.0 |
| "Cerulose" ("Cerulose" is a registered trademark) | 50.0 |
| Distilled water to 1 litre. | |

The pH of the medium is adjusted to between 5.3 and 5.7, with either potassium hydroxide or hydrochloric acid as required, and is then sterilised by heating in an autoclave.

The organism *Helminthosporium monoceras*, which is available to the public from the Commonwealth Mycological Institute located at Kew, England, where it is identified as CMI 125,855 is grown at a temperature of 25° C. in surface culture in Thomsen bottles each containing 1 litre of the above medium, and the fermentation is harvested after 13 days. The culture filtrate (80 litres) is extracted three times with ethyl acetate, the first extract using 16 litres of solvent and the two further extracts using 8 litres of solvent each time. The combined extracts are dried and evaporated to dryness under reduced pressure, and the combined residues from two such fermentations (17.3 g.) are dissolved in acetone. Silica gel (50 ml.) is added to the solution and the acetone is removed by evaporation so that the residue is adsorbed onto the silica gel. The silica gel together with the absorbed residue is placed on the top of a column of 850 ml. of silica gel made up in benzene, and the column is eluted successively with benzene (5 litres), a 1:19 (v./v.) mixture of chloroform and benzene (1 litre), a 1:9 (v./v.) mixture of chloroform and benzene (1 litre), a 1:5 (v./v.) mixture of chloroform and benzene (1 litre) and a 3:7 (v./v.) mixture of chloroform and benzene (3 litres). The material thus eluted (2.3 g.) is discarded and the column is further eluted with a 1:1 (v./v.) mixture of chloroform and benzene (7 litres). The eluant is evaporated to dryness and the residue (10.6 g.) is crystallised from a mixture of ether and petroleum ether (B.P. 60–80° C.). There is thus obtained I.C.I. Compound No. 209,946 as prisms, M.P. 63–65° C.;

$$[\alpha]_D^{24} = +53°$$

(c.=0.85 in methanol); $\nu$ (paraffin oil mull): 1673 (strong), 1619 (medium), 1584 (weak) and 1515 (medium and broad), cm.$^{-1}$; $\lambda$ max. (in methanol): 221 ($\epsilon$=24,600), 274 ($\epsilon$=11,900) and 306 ($\epsilon$=4,170) m$\mu$. (CCl$_4$): minus 1.23 (1H, singlet); 3.52 (1H, singlet); 5.03 (1H, multiplet); 5.61 (1H, doublet, 3.5 c.p.s.); 6.11 (3H, singlet); 6.23 (3H, singlet; ca. 6.1 (1H, multiplet); 7.2–9.4 (9H, multiplets). Found: C, 62.1; H, 6.5%; M, 308.1259. C$_{16}$H$_{20}$O$_6$ requires C, 62.3; H, 6.5%; M, 308.1260).

EXAMPLE 2

This example illustrates a further method for making the heterocyclic compound.

The organism described in Example 1 is grown in stirred deep culture in 5 litres of the medium described in Example 1 for 7 days, the culture being aerated by passage of a current of air at a rate of 3 litres per minute. The fermentation is harvested and the culture filtrate is extracted with ethyl acetate in a similar manner to that described in Example 1. There is thus obtained a residue (260 mg.) from which I.C.I. Compound 209,946 (60 mg.) is isolated by column chromatography similar to that described in Example 1, followed by preparative thin layer chromatography on silica gel plates using a 1:19 (v./v.) mixture of methanol and chloroform as developing solvent.

EXAMPLE 3

This example illustrates another procedure for preparing the heterocyclic compound.

The organism described in Example 1 is grown for 15 days in stirred deep culture in 80 litres of the medium described in Example 1, except that the initial pH of the medium is 5.9, the culture being aerated by passage of a current of air at a rate of 40 litres per minute. The fermentation is harvested, the mycelium being separated from the filtrate using "Hyflo Supercel" as a filter-aid (200 g. per 10 litres of filtrate) on a rotary filter, and the culture filtrate (60 litres) is extracted with butyl acetate in a similar manner to that described in Example 1. There is thus obtained a residue (17.2 g.) from which I.C.I. Compound 209,946 (6.7 g.) is isolated by column chromatography similar to that described in Example 1.

The compound isolated in this manner is in the form of plates, M.P. 58–59° C., as opposed to prisms, M.P. 63–65° C., but analytical techniques confirm that the chemical composition of the prisms and plates is identical.

EXAMPLE 4

Water is added to a solution of I.C.I. Compound No. 209,946 (200 mg.) in acetone (1 ml.) until the total volume of the mixture is 400 ml. There is thus obtained an aqueous suspension containing 500 parts per million of active ingredient which is suitable for drenching the soil surrounding growing plants, or suitable for spraying onto the leaves of cucumber, vine or apple.

The aqueous suspension described above is diluted with varying amounts of water, and there are thus obtained aqueous suspensions containing 125, 50 or 25 parts per million of active ingredient.

EXAMPLE 5

The process described in Example 4 is repeated except that the water is replaced by an 0.1% v./v. aqueous solution of the polyoxyethylenesorbitant monolaurate wetting agent "Tween" 20 ("Tween" is a registered trademark).There is thus obtained an aqueous suspension containing 500 parts per million of active ingredient which is suitable for spraying onto the leaves of wheat, barley or rice.

The aqueous suspension described above is diluted with varying amounts of the aqueous solution of the wetting agent described above, and there are thus obtained aqueous suspensions containing 125, 50 or 25 parts per million of active ingredient.

Fungal infections of plants are combatted by the compositions described in Examples 4 and 5 above as shown by the following tests:

(A) Spray-applied protectant test

The liquid preparation is sprayed directly onto the leaves of plants, a wetting agent being used when the plant is wheat, barley or rice. After a suitable period of time (time interval A) depending upon the particular plant, the plant is inoculated with the fungus under test and after a further suitable period of time (time interval B) again depending upon the particular plant and fungus, the extent of infection is assessed visually.

(B) Drench-applied protectant test

The liquid preparation is applied to the soil surrounding the plant under test, and the plant is inoculated with the fungus and the extent of infection is assessed visually as described under A above.

(C) Spray-applied eradicant test

Plants are inoculated with the fungus under test, and 24 hours after said inoculation the liquid preparation is sprayed onto the leaves of the plants as described under A above. After a further period of time (time interval C) again depending upon the particular plant and fungus, the extent of infection is assessed visually.

The activity of I.C.I. Compound 209,946 against the various fungal infections of plants is recorded in terms of a grading scale, the grading being determined by visual comparison of the percentage amount of disease on the treated plant with that of an infected but untreated control plant. The grading scale used is as follows:

| Percent amount of disease | Grading |
|---|---|
| 61–100 | 0 |
| 26–60 | 1 |
| 6–25 | 2 |
| 0–5 | 3 |

The results obtained with various plants and fungi are as follows:

PROTECTANT TEST

| Disease and plant | Spray application | | Concentration of I.C.I. 209,946 in preparation | Grading |
|---|---|---|---|---|
| | Time interval A | Time interval B | | |
| Sphaerotheca fuliginea (cucumber). | 24 hours... | 7 days.... | 500 | 3 |
| | | | 50 | 3 |
| | | | 25 | 2 |
| Erysiphe graminis (wheat). | 24 hours... | 6 days.... | 500 | 3 |
| | | | 50 | 1 |
| Erysiphe graminis (barley.) | 24 hours... | 7 days.... | 50 | 3 |
| | | | 25 | 3 |
| Podosphaera leucotricha (apple). | 24 hours... | 7 days.... | 500 | 3 |
| | | | 50 | 3 |
| Uncinula necator (vine)... | 24 hours... | 7 days.... | 500 | 3 |
| | | | 50 | 1 |
| Piricularia oryzae (rice)... | 5 hours.... | 6 days.... | 500 | 2 |
| Phytophthora infestans (tomato). | 3 days..... | 3 days.... | 500 | 2 |
| Plasmopara viticola (vine). | 5 hours.... | 11 days... | 500 | 2 |

PROTECTANT TEST

| Disease and plant | Drench application | | Concentration of I.C.I. 209,946 in preparation | Grading |
|---|---|---|---|---|
| | Time interval A | Time interval B | | |
| Sphaerotheca fuliginea (cucumber). | 72 hours... | 8 days..... | 500 | 3 |
| | | | 50 | 3 |
| | | | 25 | 2 |
| Erysiphe graminis (wheat). | 48 hours... | 5 days.... | 500 | 3 |
| | | | 50 | 3 |
| Erysiphe graminis (barley). | 72 hours... | 5 days.... | 50 | 3 |
| | | | 25 | 3 |
| Podosphaera leucotricha (apple). | 48 hours... | 6 days.... | 500 | 3 |
| | | | 50 | 3 |
| | | | 500 | 2 |
| Uncinula necator (vine) | 48 hours... | 8 days.... | 500 | 1 |
| | | | 50 | |
| Piricularia oryzae (rice)... | 72 hour..... | 5 days.... | 500 | 2 |
| | | | 125 | 2 |
| Phytophthora infestans (tomato). | 72 hours... | 3 days..... | 500 | 2 |

ERADICANT TEST

| Disease and plant | Time interval C | Concentration of I.C.I. 209,946 in preparation | Grading |
|---|---|---|---|
| Sphaerotheca fuliginea (cucumber)..... | 8 days.... | 500 | 3 |
| | | 50 | 2 |
| | | 25 | 1 |
| Erysiphe graminis (wheat)............. | 7 days.... | 500 | 3 |
| | | 50 | 3 |
| Erysiphe graminis (barley)............. | 8 days.... | 50 | 3 |
| | | 25 | 2 |
| Podosphaera leucotricha (apple)....... | 8 days.... | 500 | 3 |
| | | 50 | 3 |
| Uncinula necator (vine)............... | 8 days.... | 500 | 3 |
| | | 50 | 2 |

No sign of phytotoxic damage to the plants is observed during the above tests.

EXAMPLE 6

An intimate mixture of 12.5 parts by weight of I.C.I. Compound No. 209,946 and 87.5 parts by weight of powdered china clay is prepared by conventional means. There is thus obtained a dressing suitable for application to seeds before planting.

Germinating wheat seeds are dressed with 8 mg. of the above dressing per g. of seed and are then planted in soil which is infected with *Fusarium culmorum*. Of the seedlings which mature, 69.4% are healthy, whereas only 49.5% of undressed seedlings grown under the same conditions are healthy.

EXAMPLE 7

This example illustrates the superiority of the compound of this invention (I.C.I. Compound No. 209,946) in the control of the disease *Diplocarpon rosae* (black spot) on roses as compared with the commercially known products "Captan" and "Dinocap" which are the standard materials used to control this disease.

In the first test batches of roses of the variety known as "Iceberg" were subjected to fortnightly sprays with Captan and with I.C.I. Compound. Some roses were untreated. Others received a soil drench around their roots with a solution of the invention compound. The results are expressed below, the figures representing the percentage number of leaflets infected and being the mean figure of 5 replicate rose bushes. The solution used to treat the roses was a ball-milled suspension of the active ingredient (a.i.) in water with a small amount of a wetting agent added.

| Nature of treatment of plant | Percentage amount of a.i. in solution used for treatment | Percentage number of leaflets infected with disease |
|---|---|---|
| None | | 23.3 |
| Sprayed with Captan | 0.1 | 8.6 |
| Sprayed with invention compound (I.C.I. Compound No. 209, 946) | 0.1 | 3.9 |
| Soil around roots drenched with invention compound | 0.1 | 10.4 |

The results illustrate the marked superiority of the invention compound over Captan, and the systemic effect which it possesses and which Captan does not.

In a second test, described below there is illustrated the excellent and superior control of the mildew disease *Sphaerotheca pannosa* on roses of the variety known as "Frensham." The roses were subjected to fortnightly sprays of both "Dinocap" and the invention compound. In other respects the tests were the same as those above.

| Nature of treatment of plant | Percentage amount of a.i. in solution used for treatment | Percentage number of leaflets infected with disease |
|---|---|---|
| Untreated | | 36.0 |
| Sprayed with Dinocap | 0.025 | 28.1 |
| Sprayed with I.C.I. Compound No. 209,946.. | 0.1 | 12.8 |

EXAMPLE 8

This example illustrates the excellent control of the disease *Podosphaera leucotricha* by the compound of this invention and demonstrates that the latter is more effective than the standard compound, Dinocap, used to control this disease.

Apple trees of the variety Cox's Orange Pippin were subjected to eight fortnightly application's of Dinocap and other trees were similarly treated with the invention compound. The results below are the mean of 6 replicate trees and are the mean of the percentage number of leaves infected with secondary mildew at the end of the series of fortnightly sprays. There were no phytotoxicity effects observed.

| Treatment of tree | Rate of usage of a.i. in treatment | Percentage number of leaves infected |
|---|---|---|
| None | | 51.6 |
| Dinocap | ½ lb./acre... | 29.0 |
| Invention compound (I.C.I. Compound No. 209,946). | ....do...... | 19.0 |

A statistical analysis of the figures of 29.0 and 19.0 for Dinocap and the invention compound respectively, show a "significant difference at 5% level." The test results clearly show the considerable superiority of the invention compound over Dinocap.

We claim:
1. The compound 2,3,3a,9b-tetrahydro-6-hydroxy-7,8-dimethoxy-2-n-propyl - 5H - furo[3,2-c][2]benzopyran-5-one.

References Cited
UNITED STATES PATENTS
2,971,962   2/1961   Hawthorne et al. __ 260—343.2

JOHN M. FORD, Primary Examiner

U.S. Cl. X.R.
424—279